United States Patent [19]
Sauey et al.

[11] 3,811,216
[45] May 21, 1974

[54] ADJUSTABLE FISHING ROD CASE

[75] Inventors: Lawrence K. Sauey; Leroy W. Mason; Gerald A. Rau, all of Baraboo, Wis.

[73] Assignee: Flambeau Products Corporation, Baraboo, Wis.

[22] Filed: Nov. 3, 1972

[21] Appl. No.: 303,622

[52] U.S. Cl. .................................................. 43/26
[51] Int. Cl. ............................................ A01k 97/08
[58] Field of Search .............. 43/26, 54.5, 57.5, 11, 43/12; 220/8; 285/298, 302, 303

[56] References Cited
UNITED STATES PATENTS

| | | | |
|---|---|---|---|
| 3,356,246 | 12/1967 | Marshall et al. | 220/8 |
| 2,962,187 | 11/1960 | Morris | 43/26 |
| 2,143,720 | 1/1939 | Smith | 43/26 |
| 1,209,008 | 12/1916 | Messina | 285/303 |
| 2,885,223 | 5/1959 | Duff | 285/303 |

FOREIGN PATENTS OR APPLICATIONS
990,911   5/1965   Great Britain .......................... 43/12

Primary Examiner—Warner H. Camp
Attorney, Agent, or Firm—Molinare, Allegretti, Newitt & Witcoff

[57] ABSTRACT

An adjustable fishing rod case is provided with an outer member, an inner member, and means for securing the members together. The outer member and inner member are telescopically engaged. A plastic hinge lever, including a pin, is mounted on a collar at one end of the outer member. The pin engages one of a series of well-shaped cups in the inner member to lock the members together. A longitudinal groove in the inner member receives a projection on the collar of the outer member to guide the well-shaped cups to the pin.

3 Claims, 8 Drawing Figures

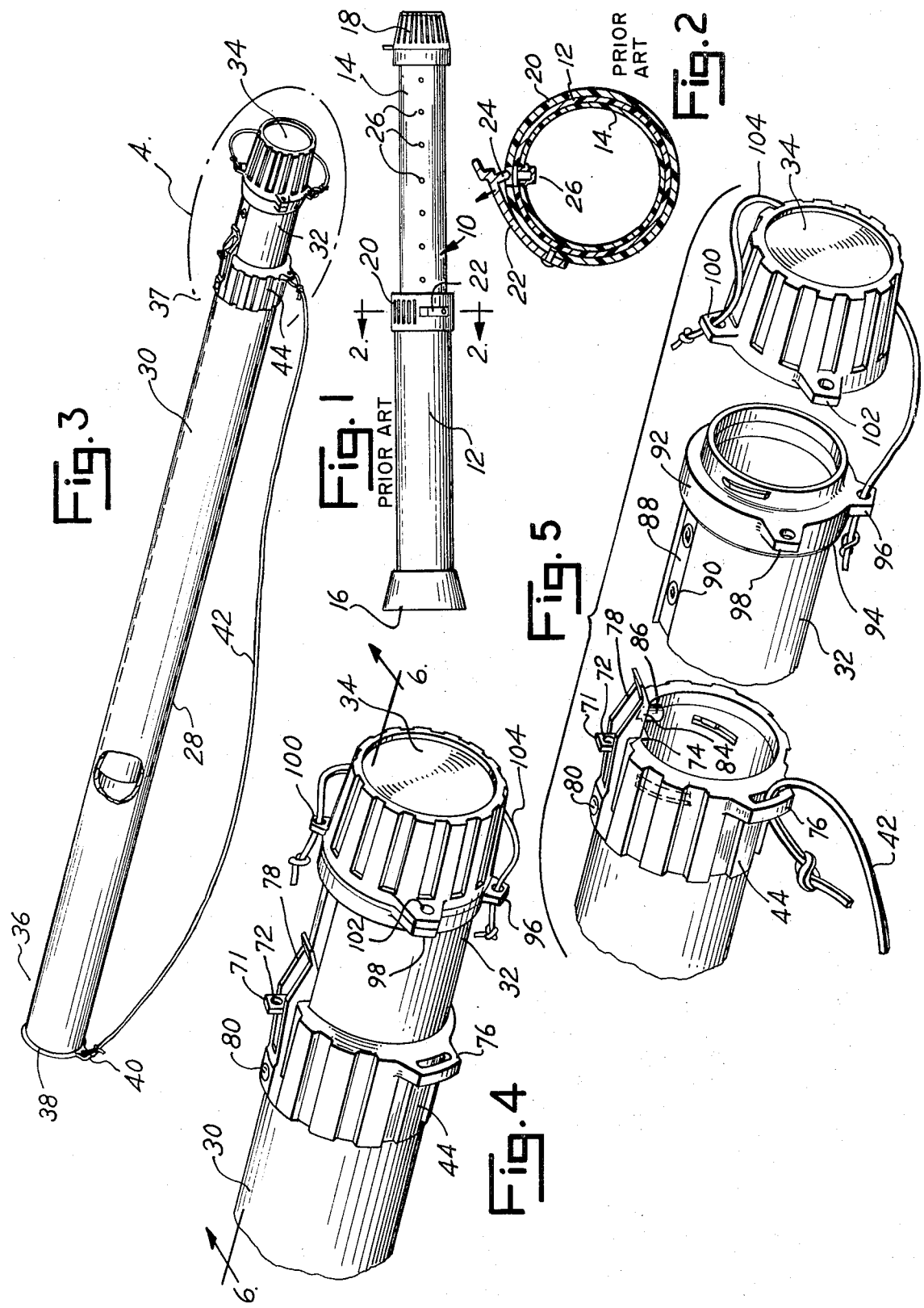

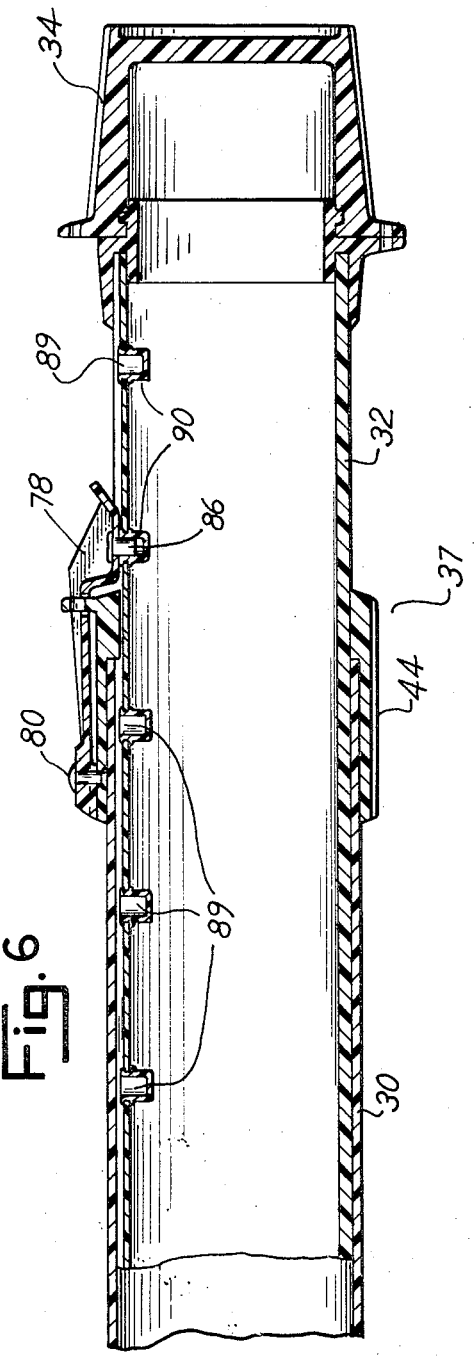
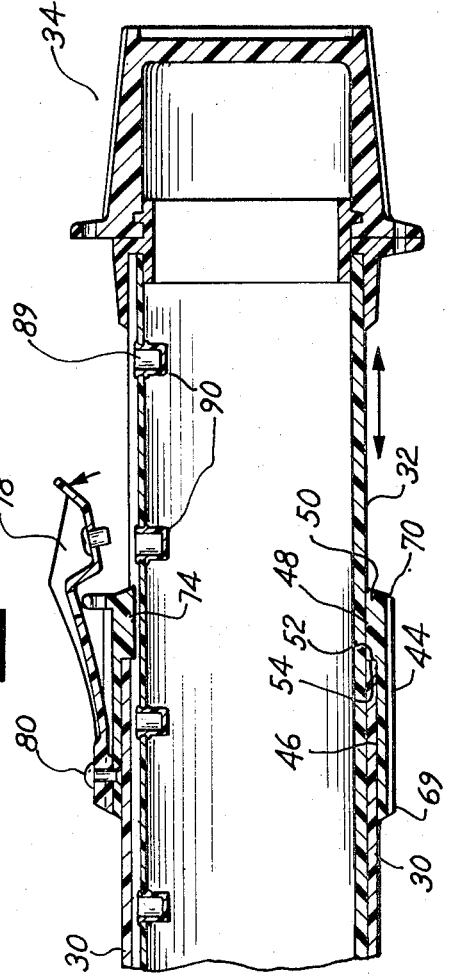
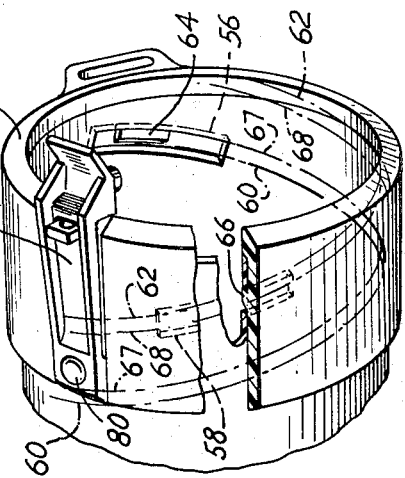

ADJUSTABLE FISHING ROD CASE

BACKGROUND OF THE INVENTION

This invention relates to an improved fishing rod case, and particularly to a fishing rod case the length of which may be adjusted.

A large percentage of fishing rods sold today are of the type which can be broken down into sections. The number of sections per rod and the length of each section vary according to manufacturer. The popularity of the sectioned fishing rod has led to the development of the fishing rod case.

Fishing rod cases generally comprise a cylindrical member which is permanently closed at one end and closable at the opposite end by a screw-on or snap-on cap. The fishing rod sections may be stored in the tube.

A problem encountered with this type of fishing rod case is that the case cannot be used for all rods. Rods with sectional lengths that exceed the length of the fishing rod case cannot be stored in such a case. To remedy this problem, fishing rod cases of adjustable length were developed.

Adjustable fishing rod cases normally comprise two hollow, cylindrical members, one member being slidable within the other. A mechanism is provided for securing the two hollow members together. The prior art teaches that the two members can be secured by a frictional lock.

Later models secured the members together by a pin-and-hole arrangement. FIG. 1 illustrates such a prior art case. A collar is mounted on the larger, outer member near the end thereof which receives the smaller, inner member. Affixed to the collar is a steel spring clip which includes a pin. The pin fits through a hole in the collar and engages any one of a series of openings provided in the smaller, inner member.

While meeting the immediate objective of providing an adjustable fishing rod case, the prior art cases have certain disadvantages. One disadvantage is that the adjustment tends to be cumbersome and difficult. In the prior art case shown in FIG. 1, for example, the hole in the larger, outer member must be aligned with the opening in the smaller, inner member before the pin may be inserted to secure the members together. Thus one finds himself looking for a hole through a hole.

Another disadvantage is that the prior art cases are not sufficiently watertight. If the case is dropped into the water, it will often quickly sink, giving its owner little or no time for recovery.

A final disadvantage is the ease with which the prior art cases can be opened. An inquisitive child need only snap off the cover to gain access to the expensive equipment stored therein.

SUMMARY OF THE INVENTION

The present invention of an improved, adjustable fishing rod case comprises two hollow, elongated members, telescopically engaged, and means for securing the two members together. A collar is attached to one end of the larger, outer member, and a plastic hinge lever, including a pin, is affixed to the collar. The pin engages one of a series of well-shaped cups provided in the smaller, inner member. The smaller, inner member includes a longitudinal recessed groove to receive a projection extending inwardly from the inner surface of the collar attached to the larger, outer member. The well-shaped cups of the smaller, inner members are positioned in the recessed groove. The plastic hinge lever is aligned with respect to the projection on the collar so that the well-shaped cups are guided to and pass under the pin. The collar attached to the larger, outer member includes means by which the pin may be locked into one of the well-shaped cups. The outside ends of the two members are closed or closable by cover means, which may also include locking means.

It is thus an object of the present invention to provide a telescoping fishing rod case the length of which may be easily and quickly adjusted.

Another object is to provide a telescoping fishing rod case sufficiently watertight to be buoyant for at least a short period time.

It is a further object of the present invention to provide a telescoping fishing rod case with appropriate means to prevent tampering.

These and other objects, advantages and features of the present invention will be more fully set forth in the detailed description which follows.

BRIEF DESCRIPTION OF THE DRAWINGS

FIG. 1 illustrates a known prior art fishing rod case;

FIG. 2 is a cross-sectional view taken along line 2 — 2 of FIG. 1;

FIG. 3 is a perspective view of the case of the present invention;

FIG. 4 is an enlarged perspective view of the present invention, showing the two hollow, elongated members, the case cap and the locking mechanism;

FIG. 5 is an exploded view of the structure shown in FIG. 4;

FIG. 6 is a cross-sectional view taken along line 6 — 6 of FIG. 4;

FIG. 7 is a cross-sectional view similar to FIG. 6 wherein the plastic hinge lever and pin are retracted to permit an adjustment of length; and FIG. 8 is a cut-away view of the larger, outer member and collar.

DESCRIPTION OF THE PREFERRED EMBODIMENT

FIGS. 1 and 2 show a prior art fishing rod case 10, discussed briefly in the Background of the Invention. Referring to FIGS. 1 and 2, the prior art case includes an outer, cylindrical member 12 and an inner, cylindrical member 14. The inner member 14 telescopes into the outer member 12. The outer end of the outer member 12 is closed by a cover 16. The outer or exposed end of the inner member 14 is threaded to receive a threaded cap 18.

A collar 20 is fastened to the inner end of the outer member. A spring steel clip 22 is attached at one end to the collar 20. A pin 24 is attached to the opposite end of the spring steel clip 22. The pin 24 fits through a hole in the collar 20 and engages any desired one of a series of spaced, well-shaped openings or cups 26 defined along the length of the inner member 14. This engagement secures the inner member 14 to the outer member 12.

FIGS. 3–8 illustrate the present invention. Referring to FIG. 3, the fishing rod case 28 includes an outer member 30, an inner member 32 and a cap 34. These parts are assembled in the manner to be described.

First, however, each of the separate parts will be described in detail.

Referring to FIG. 3, the outer member 30 is an elongated, cylindrical tube. It is to be understood that the shape of the outer member 30 may be modified without departing from the true spirit of the present invention, provided the outer member 30 and the inner member 32 are of similar shape to permit the telescoping action.

The outer member 30 has an outer end 36 and an inner end 37. The outer end 36 is closed by a cover 38. The cover 38 includes a first eyelet 40 for receipt of a carrying strap 42.

Attached to the inner end 37 is a collar 44. Referring to FIG. 7, the collar 44 has an outer end 69 and an inner end 70, an outer portion 46 and an inner portion 48.

The outer portion 46 fits over the end of the outer member 30. The outer portion 46 generally has the same internal shape and diameter as the outer surface of the outer member 30.

The inner portion 48 extends beyond the end of the outer member 30. The inner diameter of the inner portion 48 is less than the outer diameter of the outer member 30, thereby defining an annular projection 50 extending inwardly from the collar 44 and having an inner, circumferential surface 52. Surface 52 abuts surface 54 of the outer member 30 to prevent slippage of the collar 44 along the outer member 30. Coaction of surface 52 and surface 54 also aligns the collar 44 with respect to the outer member 30.

Referring to FIG. 8, the outer member 30 also includes a pair of rectangular slots 56 and 58 near the inner end 37. The rectangular slots 56 and 58 are 180° apart. The long axes of the rectangular slots 56 and 58 are generally parallel to a pair of helixes 60 and 62 on the outer member 30.

The rectangular slots 56 and 58 receive a pair of projections 64 and 66, respectively, that extend inwardly from the inner surface of the outer portion 46 of the collar 44. The projections 64 and 66 are rectangular and generally align with a pair of helixes 67 and 68 on the inner surface of the collar 44.

The orientation of the rectangular slots 56 and 58 and the projections 64 and 66 provides a screwing action to force the outer member 30 into the collar 44 as the collar 44 is rotated about the outer member 30. Thus, surface 54 of the outer member 30 is urged against the inner, circumferential surface 52 of the collar 44. The result is a tight-fitting collar 44 which is no way interferes with the telescoping action of the fishing rod case 28.

Referring to FIG. 5, the collar 44 also includes a tab 71, a flange 74, and a second eyelet 76. The tab 71 is adjacent to the inner end 70 and extends outwardly. The tab 71 includes an aperture 72 for receipt of a padlock (not shown).

The flange 74 projects inwardly from the inner surface of the inner portion 48 of the collar 44. The second eyelet 76 extends outwardly from the collar 44 to receive the carrying strap 42. The carrying strap 42 allows the fishing rod case 28 to be easily carried.

A plastic hinge lever 78 is affixed at one end by a rivet 80 to the outer end 69 of the collar 44. The plastic hinge lever 78 is pliable and therefore may be flexed or pivoted about the rivet 80.

The plastic hinge lever 78 includes an opening (not shown) which allows the plastic hinge lever 78 to fit over the tab 71 when the plastic hinge lever 78 is not flexed or pivoted. Thus, when the tab 71 receives a padlock (not shown), the plastic hinge 78 cannot be retracted.

A portion 84 of the plastic hinge lever 78 extends beyond the inner end 37 of the outer member 30. The portion 84 includes a pin 86 which extends from the lower surface of the portion 84 towards the center of the outer member 30.

The plastic hinge lever 78 is affixed to the collar 44 such that the pin 86 and the flange 74 align. This facilitates the securing of the inner member 32 to the outer member 30 in a manner to be discussed hereafter.

Referring to FIG. 3, the inner member 32 is also desirably an elongated, cylindrical tube. The outer diameter of the inner member 32 is substantially equal to the inner diameter of the outer member 30. This permits the telescoping action of the two members 30 and 32 by placing the outer surface of the inner member 32 and the inner surface of the outer member 30 in a sliding relationship. This sliding relationship develops a slight liquid level pressure seal between the two members 30 and 32 sufficient to give the assembled fishing rod case 28 buoyancy for a limited period of time.

Referring to FIGS. 5 and 6, a portion of the inner member 32 is recessed to form a longitudinal groove 88. The longitudinal groove 88 receives the flange 74 on the collar 44 of the outer member 30. A series of holes 89 is drilled along the length of the longitudinal groove 88. The holes 89 are equally spaced.

A series of well-shaped cups 90 is forcibly inserted into the holes 89 drilled along the longitudinal groove 88. The outer diameter of the well-shaped cups 90 is slightly greater than the diameter of the holes 89 such that the well-shaped cups 90 fit tightly into the holes 89 to prevent water from leaking into the assembled fishing rod case 28.

A threaded collar 92 is attached to an outer end 94 of the inner member 32. The threaded collar 92 includes an outwardly extending connecting eyelet 96 and an outwardly extending locking eyelet 98.

The cap 34 is threaded to screw onto the threaded collar 92. The cap 34 includes an outwardly extending connecting eyelet 100 and an outwardly extending locking eyelet 102. A strap or cord 104 ties between the connecting eyelets 96 and 100, fastening the cap 34 to the threaded collar 92. The locking eyelets 98 and 102 are arranged such that they align when the fishing rod case 28 is assembled and closed by the cap. (See FIG. 4.) The alignment allows the cap 34 to be locked to the threaded collar 92 by means of a padlock (not shown).

In the assembled fishing rod case, the inner member 32 slides within the outer member 30 in a telescoping fashion, and it is this action which gives the fishing rod case 28 variable length. The longitudinal groove 88 in the inner member 32 receives the flange 74 on the collar 40 of the outer member 30 to allow longitudinal sliding, but to prohibit the rotation of the inner member 32 with respect to the outer member 30. With this tracking mechanism, the series of well-shaped cups 90 in the inner member 32 is guided to and passes under the plastic hinge lever 78 and the pin 86, aligned with the flange 74, as the two members 30 and 32 are telescoped. To secure the inner member 32 to the outer member 30, the pin 86 is inserted into any one of the well-shaped cups 90.

To adjust the length of the fishing rod case, the outer member 30 is held in one hand as the plastic hinge lever 78 is retracted, disengaging the pin 86 from one of the well-shaped cups 90. The inner member 32 is then pulled or pushed from or into the outer member 30 until the desired length is reached. The plastic hinge lever 78 is then released and a final adjustment of the inner member 32 is made so that the pin 86 may engage one of the well-shaped cups 90.

There are several advantages of the present invention. One is the ease with which the length of the fishing rod case 28 may be adjusted. It will be noted that the present invention operates without a hole for the pin 86 in the collar 44 of the type disclosed in the prior art case shown in FIG. 1. As a result, one need only position the desired well-shaped cup 90 beneath the pin 86 in order to secure the inner member 32. This is easily accomplished by means of the flange 74 and longitudinal groove 88 arrangement which actually guides the well-shaped cups 90 to the pin 86. Thus, the length of the fishing rod case 28 may be adjusted quickly and with a minimum of effort.

A second advantage is the bouyancy of the present invention. The unique method for attaching the collar 44 to the outer member 30 without interfering with the telescoping action of the fishing rod case 28 allows the inner surface of the outer member 30 to be in sliding relationship with the outer surface of the inner member 32. This sliding relationship is sufficient to develop a slight liquid level pressure seal between the members 30 and 32. Thus, if the case is dropped in the water, it will float for at least a short period of time.

A third advantage results from the unique anti-tampering devices found on the present invention. When the fishing rod case 28 is closed by the cap 34, the locking eyelet 98 and the locking eyelet 102 align such that the cap 34 may be padlocked to the threaded collar 92. In addition, the tab 71, over which the plastic hinge lever 78 fits, may also be padlocked. This makes it difficult for the plastic hinge lever 78 to be retracted with the result that the outer member 30 and inner member 32 may not be readily separated. These devices resist unauthorized tempering with the expensive fishing equipment stored in the fishing rod case 28.

What is claimed is:

1. A fishing rod container comprising, in combination:
    a first hollow, elongated member having an outer and inner surface, a closed end and an open end, and first guide means;
    flexible lever means affixed to said outer surface of said first member and extending beyond said open end, said flexible lever means including a pin; and
    a second hollow, elongated member having an outer surface, a closeable end, second guide means extending longitudinally along the length of said second member, and a series of well-shaped cups secured longitudinally along said second member, said second member being telescopically received by said first member in an assembled state, said outer surface of said second member slidably engaging said inner surface of said first member in said assembled state to provide limited buoyancy, said first and second guide means cooperating in said assembled state to provide means for aligning said flexible lever means with said series of well-shaped cups to permit said pin to engage a desired one of said well-shaped cups to rigidly secure said closeable end of said second member at a desired distance from said closed end of said first member.

2. A fishing rod container as claimed in claim 1 wherein said first guide means comprises a flange projecting inwardly from the inner surface of said first member and said second guide means comprises a groove for receiving said flange.

3. The fishing rod container of claim 1 wherein said first member includes a locking tab and said flexible lever means includes an opening, said locking tab engaging said opening, whereby said pin may be locked in said desired well-shaped opening.

* * * * *